US006638555B2

(12) United States Patent
Bank et al.

(10) Patent No.: US 6,638,555 B2
(45) Date of Patent: Oct. 28, 2003

(54) METHOD OF PREPARING STORAGE STABLE, CITRUS-FLAVORED COMPOSITIONS COMPRISING PLANT EXTRACTS

(75) Inventors: Virginia R. Bank, Boulder, CO (US); David T. Bailey, Boulder, CO (US); Johan T. van Leersum, Cincinnati, OH (US)

(73) Assignee: Hauser, Inc., Longmont, CO (US)

( * ) Notice: Subject to any disclaimer, the term of this patent is extended or adjusted under 35 U.S.C. 154(b) by 5 days.

(21) Appl. No.: 10/027,841

(22) Filed: Oct. 19, 2001

(65) Prior Publication Data

US 2002/0098269 A1 Jul. 25, 2002

Related U.S. Application Data

(62) Division of application No. 09/103,023, filed on Jun. 23, 1998, now Pat. No. 6,306,450.
(60) Provisional application No. 60/050,481, filed on Jun. 23, 1997, now abandoned.

(51) Int. Cl.⁷ ............................... A23L 1/22; A23L 2/00
(52) U.S. Cl. ...................... 426/534; 426/599; 424/736
(58) Field of Search ................................. 426/534, 533, 426/538, 541, 590, 599; 424/439, 441, 442, 736, 725

(56) References Cited

U.S. PATENT DOCUMENTS

| 4,012,531 A | 3/1977 | Viani ......................... 426/431 |
| 4,084,012 A | 4/1978 | Krumel et al. ............... 426/590 |
| 4,263,149 A | 4/1981 | Sprecker et al. ............. 252/8.9 |
| 4,391,830 A | 7/1983 | Gudnason et al. ............ 426/43 |
| 5,023,017 A | 6/1991 | Todd, Jr. .................... 252/407 |
| 5,603,952 A | 2/1997 | Soper ......................... 424/456 |
| 5,616,353 A | 4/1997 | Wright et al. ................ 426/324 |
| 6,306,450 B1 * | 10/2001 | Bank et al. .................. 426/534 |

FOREIGN PATENT DOCUMENTS

WO        WO 95/21018        8/1995

* cited by examiner

*Primary Examiner*—Leslie Wong
(74) *Attorney, Agent, or Firm*—Steven C. Petersen; Sarah O'Rourke; Hogan & Hartson LLP

(57) ABSTRACT

A method of preparing storage-stable, citrus-flavored compositions containing comprising citral or a citral derivative as the flavoring agent and a plant extract as the stabilizing agent. The plant extract inhibits the formation of p-methylacetophenone, thereby preventing the development of off-flavors and off odors and increasing the shelf life of the composition.

14 Claims, 3 Drawing Sheets

METHOD OF PREPARING STORAGE STABLE, CITRUS-FLAVORED COMPOSITIONS COMPRISING PLANT EXTRACTS

CROSS-REFERENCE TO OTHER APPLICATIONS

This patent application is a divisional application of U.S. patent application Ser. No. 09/103,023, filed Jun. 23, 1998, now U.S. Pat. No. 6,306,450, and entitled "Storage Stable, Citrus-Flavored Compositions Comprising Plant Extracts," which claims the benefit of U.S. Provisional Application No. 60/050,481, filed Jun. 23, 1997, now abandoned.

BACKGROUND OF THE INVENTION

1. Field of the Invention

The present invention relates generally to storage-stable, citrus-flavored compositions and to methods for their preparation. In particular, the invention relates to storage-stable foods and beverages containing citral as the flavoring agent and a plant extract as the stabilizing agent.

2. Description of the State of the Art

Citral (shown as the isomer neral (A) in FIG. 1) is the key flavor component in citrus fruits (e.g., lemon, lime, grapefruit and orange), fresh citrus juices, and lemon grass. Unfortunately, citral is very unstable and rapidly decomposes through a series of cyclization and oxidation reactions, particularly in the presence of an acid. (Baines, D., et al., *Tetrahedron*, 26:4901–4913 (1970); Slater, C. A. and Watkins, W. T., *J. of Science and Food Agriculture*, 15:657–664 (1964); Clark, Jr., B. C., et al., *Tetrahedron*, 33:2187–2191 (1977); and Clark, Jr., B. C. and Chamblee, T. S., "Off-Flavors in Foods and Beverages", (Charalambous, G., editor), pp. 229–285 (1992)). The lower the pH of the citrus solution, the higher the rate of cyclization (Freeburg, E. J., et al., *Perfumer and Flavorist*, 19:23–32 (1994)). In addition to reducing the fresh citrus flavor, these oxidation and cyclization reactions produce potent flavor and odorant compounds, which significantly decrease the shelf life of citrus-flavored products.

FIG. 1 is a schematic diagram showing the cyclization and oxidation reactions in the citral degradation pathway. The major reaction products of citral degradation, under both mild and astringent aqueous conditions, are cyclic alcohols (compounds B and C) which have a bland, mild fruity taste. Alcohol production continues until the citral is depleted (Clark and Chamblee, supra). In the presence of oxygen, compounds B and C oxidize to p-cymen-8-ol (compound D), which dehydrates to p-$\alpha$-dimethylstyrene (compound E). Further oxidation of p-$\alpha$-dimethylstyrene produces p-methylacetophenone (compound F) and p-cresol (compound G). (Schieberle, P., et al., *Z. Lebensm. Unters. Forsch.*, 187:35–39 (1988)). All four of these oxidation products (compounds D, E, F and G) are believed to contribute to off-flavor development, which limits the shelf life of citrus-flavored foods and beverages. Although each of these breakdown products are thought to affect the quality of aged citrus products, the relative contributions of compounds D, E, F and G to off-flavor development depend upon the taste thresholds of these compounds. For example, the taste threshold of p-cymen-8-ol (compound D) is high compared to other oxidation products, particularly p-methylacetophenone (compound F). Thus, considering its threshold, p-cymen-8-ol does not contribute as significantly to the off-flavor of deteriorated citrus products as do other citral oxidative degradation products.

Methods for stabilizing foods and flavor particles, including aromatic compounds such as fruit flavors and citrus oils, have been proposed. U.S. Pat. No. 5,603,952 to Soper describes a method for forming microencapsulated food and flavor particles. Soper's method involves encapsulation with fish gelatin (complex coacervation) to protect the flavorant from degradation.

Freeburg et al., supra, refers to a method for stabilizing lemon-flavored beverages by making a citralless lemon solution. The referenced method removes citral from the flavor system, thereby eliminating off-flavor formation due to citral degradation. This citralless flavor system lacks the fresh lemon/fruity characteristics associated with citral.

Other researchers have investigated the effects of various antioxidants on citral degradation, and specifically the formation of oxidative degradation products (compounds D, E, F and G). Kimura et al. report that none of the free-radical terminators (antioxidants) they tested (i.e., butylated hydroxytoluene (BHT), butylated hydroxyanisole (BHA), propyl gallate, d,1-$\alpha$-tocopherol, nordihydroguaiaretic acid and n-tritriacontane-16,18-dione, isolated from the leaf wax of the Eucalyptus tree) inhibited the formation of these citral oxidative degradation products in an aqueous citral solution. (Kimura, K., et al., *J. of Agricultural and Food Chemistry*, 31:801–804 (1983); and Kimura, K., et al., *Agricultural and Biological Chem.*, 47:1661–1663 (1983)). Because these antioxidants failed to prevent formation of oxidative products, Kimura et al. concluded that citral degradation can proceed in the absence of oxygen. However, Peacock and Kuneman report that isoascorbic acid, an oxygen scavenger, inhibits the formation of p-cymen-8-ol (compound D) and p-$\alpha$-dimethylstyrene (compound E) (Peacock, V. E. and Kuneman, D. W., *J. of Agricultural and Food Chem.*, 33:330–335 (1985)).

The rate of citral degradation is accelerated in foods and beverages packaged in gas permeable materials, such as polyethylene. Such materials allow oxygen to diffuse through the packaging, thereby facilitating the oxidation reactions. One product of these oxidation reactions, p-methylacetophenone (compound F), has a strong, bitter almond-like flavor and odor. Because the taste and odor thresholds of p-methylacetophenone are low relative to the other flavor components, this compound is a major contributor to the undesirable off-flavor and odor associated with aged citrus-flavored food products (Freeburg et al., supra). None of the above-referenced antioxidant compounds are effective in preventing formation of this potent odorant.

A need therefore exists for a method for improving the stability and shelf life of citrus-flavored compositions, particularly citral-flavored foods and beverages. More specifically, a need exists for a stabilizing agent which effectively inhibits the formation of the potent flavorant and odorant p-methylacetophenone.

SUMMARY OF THE INVENTION

Accordingly, this invention provides a storage-stable, citrus-flavored composition.

More specifically, this invention provides a storage-stable, citrus-flavored composition comprising a plant extract as the stabilizing agent. The plant extract protects the flavor component(s) from chemical reactions, thereby stabilizing the flavor system and preventing the formation of off-flavor substances, particularly p-methylacetophenone.

This invention thus provides a storage-stable, citrus-flavored composition, wherein the composition is characterized by the presence of a plant extract as a stabilizing agent, particularly a water-soluble plant extract comprising a caffeic acid derivative, such as rosmarinic acid.

The present invention also relates to methods for preparing storage-stable, citrus-flavored compositions. The method of the invention comprises the steps of providing a citrus-flavored composition, and adding a stabilizing agent comprising a plant extract to the citrus-flavored composition to obtain a storage-stable, citrus-flavored composition comprising a plant extract as the stabilizing agent.

The present invention further relates to a method for improving the stability of a citrus-flavored composition comprising the application of an effective amount of a stabilizing agent comprising a plant extract, particularly a plant extract comprising rosmarinic acid.

The primary advantage of the present invention is therefore the improved shelf life of citrus-flavored compositions, particularly citral-flavored foods and beverages. The flavor-stabilizing effect of plant extracts comprising rosmarinic acid is surprisingly and unexpectedly superior to that of other stabilizing agents. The flavor-stabilizing agent of the present invention is naturally occurring, and has no known toxic effects. This flavor-stabilizing agent is also obtained relatively easily, inexpensively, and in commercially-viable quantities from natural materials.

Other features and advantages of the present invention will become apparent from the following detailed descriptions. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are incorporated in and form a part of the specification, illustrate the preferred embodiments of the present invention, and together with the description serve to explain the principles of the invention. In The Drawings.

DETAILED DESCRIPTION OF THE INVENTION

Figure 1:
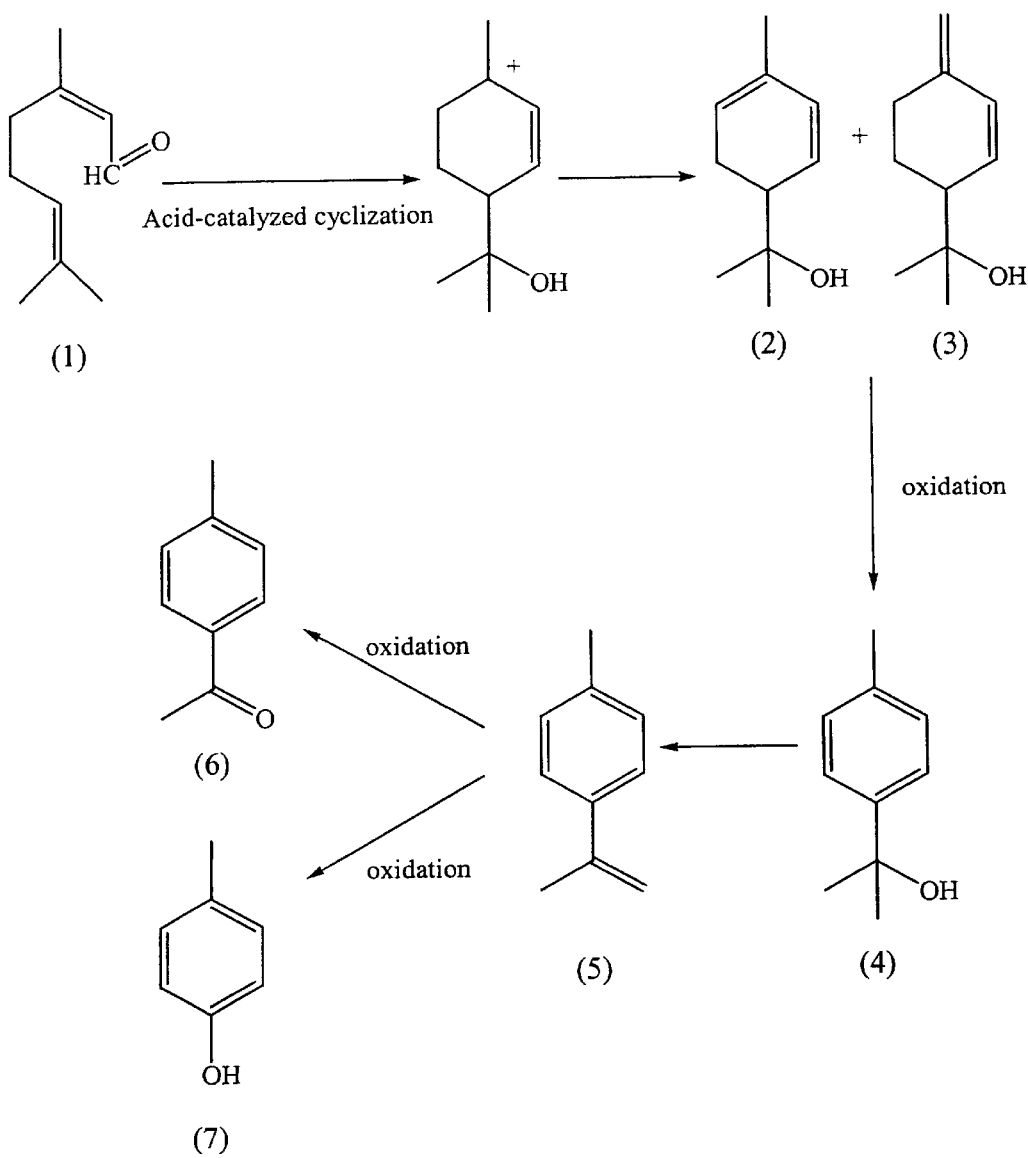
FIG. 1 is a schematic diagram of the citral degradation pathway.

The present invention relates to storage-stable, citrus-flavored compositions and to methods for their preparation. More particularly, the invention relates to storage-stable, citrus flavored compositions comprising citral or a citral derivative as the flavoring agent, and a plant extract as the stabilizing agent.

As, used herein, "storage stable" means that the stability of the flavor system is improved in the presence of the stabilizing agent relative to the stability of the flavor system without the stabilizing agent. In the examples shown, the concentration of p-methylacetophenone (a potent odorant byproduct of citral degradation) in formulations comprising a plant extract is less than the concentration of p-methylacetophenone in formulations without a plant extract. The term "stabilizing agent," as used herein, refers to compounds which increase the stability of the citrus flavor system. The stabilizing agents of the present invention increase the stability of the citrus flavor system by inhibiting the synthesis of undesirable oxidative degradation products, particularly p-methylacetophenone.

Citrus flavor stabilization in accordance with the present invention is effective with citrus-flavored compositions in general and particularly applicable to compositions containing citral and/or a citral derivative as the flavor ingredient. The invention is characterized by adding a plant extract to a citrus-flavored composition, wherein the plant extract is derived from a plant of the family Labiatae. As used herein, "plant extract" refers to a substance derived from a plant source, including modifications thereof, and which can be obtained using the general methods recited herein and other equivalent methods generally known in the art. The term "water-soluble plant extract," as used herein, means a plant extract which is soluble in water. Active ingredients contained in these extracts include caffeic acid derivatives such as rosmarinic acid. The citrus-flavor component, generally referred to herein as the "flavoring agent," in the compositions of the present invention can originate from a natural source, such as a citrus oil, by modifications of naturally occurring flavorant compounds, or by chemical synthesis.

While the mechanism of citrus flavor stabilization is not fully understood, and not wishing to be bound by any specific theory, it is believed that certain compounds present in plant extracts protect the citrus flavor ingredient or derivatives of the flavor ingredient from oxidative chemical reactions. In particular, these compounds inhibit the formation of p-methylacetophenone, which is an oxidative degradation product of p-α-dimethylstyrene. p-Methylacetophenone, a potent odorant, is a major contributor to the off-flavor and odor characteristic of aged citrus-flavored compositions, particularly citral-flavored food products. Accordingly, any plant-derived compound or combination of compounds which are effective in inhibiting the formation of p-methylacetophenone are encompassed by the present invention.

The storage-stable, citrus-flavored compositions of this invention are prepared by providing a citrus-flavored composition (i.e., a composition comprising a synthetic or natural citrus flavor component, preferably citral or a citral derivative) and adding a stabilizing agent to the composition. The stabilizing agent is a water-soluble plant extract comprising rosmarinic acid, an antioxidant compound. Rosmarinic acid is found in a number of plants including, but not limited to, members of the Labiatae family such as *Rosmarinus officinalis, Collinsonia candensis, Cunila origanoides, Glechoma hederacea, Hedeioma pulegioides, Hyssopus officinalis, Lycopus virginicus, Melissa offinialis*, species of the Mentha and Monarda genus, *Nepeta cataria*, species of the Origanum genus, *Perilla frutescens, Prunella vulgaris*, species of the Pycnathemum genus, species of the Saliva genus, *Thymus vulgaris, Ballota nigra, Leonotis leonurus* and *Marrubium vulare*. This list is by way of illustration only and is not intended, in anyway, to be limitative thereof. Other plant sources useful to the present invention include any food and "Generally Recognized As Safe" (commonly referred to as "GRAS") material which contains appreciable amounts of rosmarinic acid. Such extracts are particularly important because they do not require FDA approval for use in foods. The stabilizing agents of the present invention are naturally occurring, and have no known toxic effects. These water-soluble plant extracts and compounds are obtained relatively easily, inexpensively, and in commercially-viable quantities from natural materials.

Levels of citral degradation are directly correlated with temperature and time as governed by chemical kinetics. Specifically, high levels of decomposition are typically associated with high temperatures and long periods of time. By convention, the food and beverage industries typically use accelerated aging studies to test the relative stability of various product formulations. In such tests, high temperatures (e.g., 30–80° C.) are used to accelerate decomposition reactions so that the stabilities of test formulations can be compared over a relatively short period of time (measured by hours or days). Results of such tests are often used to predict relative stabilities of products at lower temperatures (20–30° C.) over longer periods of time (months or years).

Figure 2:
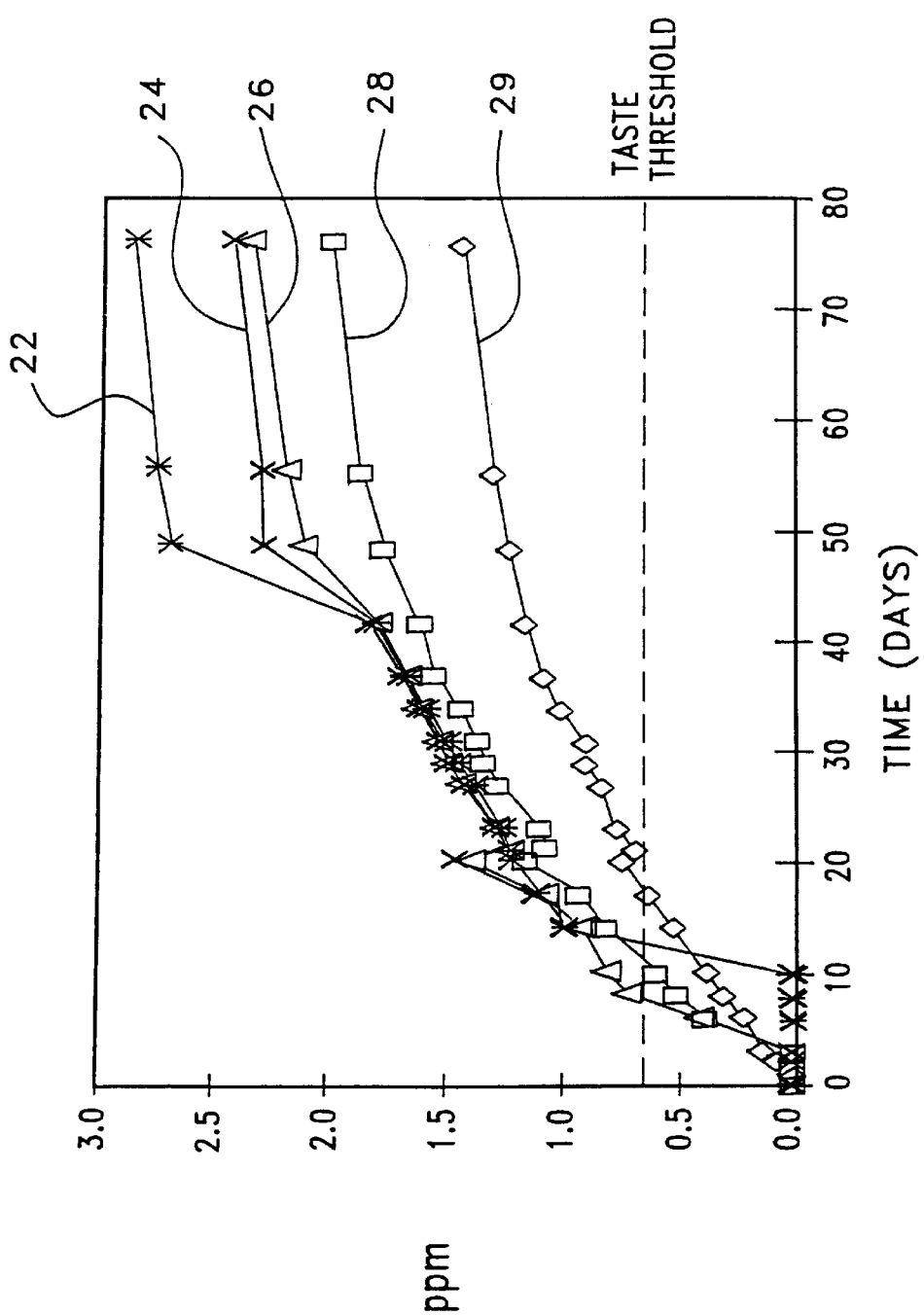
FIG. 2 is a graph of the concentration of p-cymen-8-ol (compound D) in citrus-flavored compositions as a function of time, showing the effects of a plant extract comprising rosmarinic acid on p-cymen-8-ol concentration. The upper curve 22 of the graph represents the behavior of a sample of citrus-flavored solution which contains 200 ppm of StabilEnhance® water-soluble rosemary extract (WSRE). The second curve 24 represents the behavior of a sample of citrus-flavored solution which contains 100 ppm of StabilEnhanc® WSRE. The third curve 26 represents the behavior of a sample of citrus-flavored solution which contains 50 ppm of StabilEnhance® WSRE. The fourth curve 28 represents the behavior of a sample of citrus-flavored solution which contains 25 ppm of StabilEnhance® WSRE. The bottom curve 29 represents the behavior of a control sample of citrus-flavored solution without StabilEnhance® WSRE.
Figure 3:
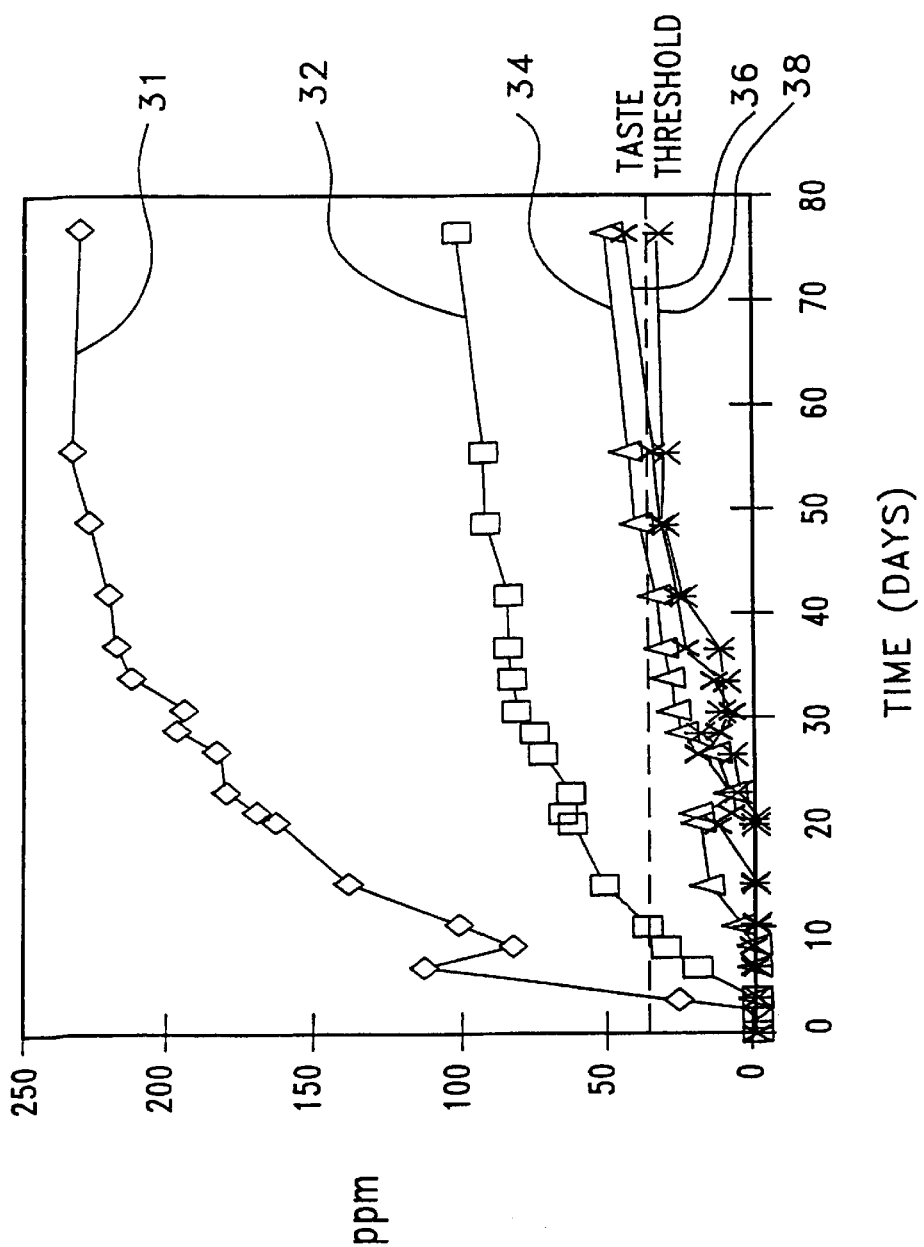
FIG. 3 is a graph of the concentration of p-methylacetophenone (compound F, a potent citral degradation product) in citrus-flavored compositions as a function of time, showing the inhibitory effects of a plant extract comprising rosmarinic acid on p-methylacetophenone concentration. The upper curve 31 of the graph represents the behavior of a control sample of citrus-flavored solution without StabilEnhance® WSRE. The second curve 32 represents the behavior of a sample of citrus-flavored solution which contains 25 ppm of StabilEnhance® WSRE. The third curve 34 represents the behavior of a sample of citrus-flavored solution which contains 50 ppm of StabilEnhance® WSRE. The fourth curve 36 represents the behavior of a sample of citrus-flavored solution which contains 100 ppm of StabilEnhance® WSRE. The bottom curve 38 represents the behavior of a sample of citrus-flavored solution which contains 200 ppm of StabilEnhance® WSRE.

In the present invention, accelerated aging tests have been used to compare the stability of citrus-flavored compositions, with and without a stabilizing agent (Example 2). Several important results are evident. First, as shown in FIG. 2, the presence of a plant extract significantly increases the rate of formation of p-cymen-8-ol. Second, and most importantly, citrus-flavored compositions containing a plant extract produce substantially less p-methylacetophenone in accelerated aging tests than compositions which contain no added plant extract (FIG. 3). The effect of adding plant extract is evident within the first few days, and becomes increasingly more pronounced over time. This effect is particularly significant when viewed in terms of the taste threshold for p-methylacetophenone (shown as the horizontal broken line in FIG. 3), which is relatively low. As shown in FIG. 3, citrus-flavored compositions containing 25 ppm of a water-soluble rosemary extract (WSRE), sold by Hauser, Inc., Boulder, Col., under the trademark StabilEnhance®, produce substantially less p-methylacetophenone than compositions without WSRE. Moreover, citrus-flavored compositions containing at least 50 ppm of this extract produce only negligible amounts of p-methylacetophenone, i.e., concentrations at or below the taste threshold for this compound.

That addition of a plant extract containing rosmarinic acid enhances the stability of a citrus-flavored composition is surprising and unexpected. This is true in view of the fact that (1) the mechanisms of citral degradation are not known with certainty; and (2) other conventional stabilizing additives, particularly antioxidants such as BHT and BHA, failed to effectively stabilize citral solutions (Kimura, et al., *Agricultural and Biological Chemistry, supra*). As previously discussed, Kimura et al. attempted (without success) to inhibit the oxidative degradation of citral using a variety of antioxidant compounds. Based on their results, Kimura et al. concluded that citral degradation proceeds independently of oxygen.

However, research by Peacock and Kuneman, supra, and Baines et al., supra, suggests that oxygen is required for the oxidation reactions to occur. As discussed above, Peacock and Kuneman successfully inhibited the formation of p-cymen-8-ol (compound D) and p-α-dimethylstyrene (compound E) using isoascorbic acid. Because isoascorbic acid is an oxygen-scavenger, it removes dissolved oxygen and oxygen in the headspace of the beverage, thereby reducing the amount of oxygen that is available for oxidation reactions. The antioxidant compound in the plant extract of this invention, rosmarinic acid, is not an oxygen scavenger, but a free radical terminator. However, as discussed above, Kimura et al. report that free radical terminators are ineffective in preventing citral degradation. Therefore, it is surprising that plant extracts containing rosmarinic acid would have this inhibitory effect.

In addition, the stabilizing agent of the present invention does not inhibit the formation of p-cymen-8-ol as does isoascorbic acid, but in fact increases the formation of this compound while inhibiting the formation of p-methylacetophenone, an oxidation product of p-cymen-8-ol. This suggests that the stabilizing agent has a different mechanism of action than isoascorbic acid.

The stabilizing agent of the present invention, which effectively inhibits the formation of p-methylacetophenone, can be prepared from the starting materials identified above using water and/or by alcohol extraction techniques. As an example, water-soluble rosemary extract (such as that sold under the trademark StabilEnhance® can be prepared from whole, dried rosemary leaves; whole, dried de-oiled rosemary leaves; or spent rosemary leaves which have been previously extracted.

In a preferred embodiment, the stabilizing agent is the water-soluble plant extract described in co-pending application U.S. Ser. No. 08/546,502, filed Oct. 20, 1995, now issued as U.S. Pat. No. 5,908,650 which is incorporated by reference in its entirety herein The process for preparing the plant extract is generally described as follows: Rosemary biomass is placed in an extraction vessel and covered with hot water. The aqueous mixture is heated to 90° C. for 5–8 hours, with occasional stirring. After the extraction is complete, the liquid is removed from the extraction vessel and filtered to separate the liquid material containing the desired compounds from the spent rosemary biomass. The liquid material is then acidified to a pH of between about 1.7 and 3.5 (preferably about 2.0) with a mineral acid such as phosphoric, sulfuric, or hydrochloric acid. The acidification can be done while the extracted material is still hot or after it has cooled to room temperature. The cooled, acidified material may be centrifuged or filtered to remove acid-insoluble solids. The acidified material is then loaded onto a suitable column containing a reversed-phase media such as C-18, polystyrene, polyacrylic ester or polymethacrylic ester. The preferred reversed-phase media is XAD-16 (polystyrene; Rohm and Haas Co., Philadelphia, Pa.). Many superfluous substances (e.g., sugars, salts, cellulose, tannins and insoluble substances) pass through the column during loading, while the desired active ingredients such as rosmarinic acid are retained on the column. The volume of the column (and hence the reversed-phase media contained therein) is sufficient to provide greater than 90% retention of the desired compounds in the loading solution. After all the acidified material has been loaded onto the column, the column is washed with approximately 2 column volumes of acidified water to remove residual impurities, then purged with air. The desirable compounds are then eluted from the column using an alcohol such as methanol or ethanol (preferably 96% ethanol). Approximately 2 column volumes of eluting solvent are required to elute approximately 100% of the desired compounds from the column. The resulting eluant can be concentrated by distillation (preferably under reduced pressure) to yield a dark, brown viscous liquid product which has an ethanol content of approximately 20–30%, a solids content of approximately 35–55%, and a rosmarinic acid content of approximately 3.5%–10%.

The above-mentioned process or other commonly known extraction/purification processes can be used on any plant material comprising rosmarinic acid, as previously discussed.

The present invention broadly includes the use of such extracts containing rosmarinic acid and/or other compounds which inhibit the formation of p-methylacetophenone in citral containing compositions, including food ingredients and food products. "Food ingredients" broadly includes flavor systems, flavor enhancers, and other edible ingredients added to foods and food products. "Foods" and "food products" broadly include solid foods, liquid beverages, and other edible materials regardless of their specific form. Although the stabilizing effect of plant extracts is exemplified using food products, the present invention is broadly applicable to a variety of non-food products including, for example, cosmetics and perfumes.

The present invention broadly includes the use of a natural plant extract which inhibits the formation of p-methylacetophenone in citral containing compositions, such as food ingredients and food products as exemplified herein. These plant extracts can be used as part of an ingredient system, an additive for foods or other products, and can be prepared in a dry (e.g., powdered) form or as a water or alcohol-based concentrate or syrup depending on the end use and the proposed method of addition.

Indeed, the present invention includes the use of plant extracts which inhibit the formation of p-methylacetophenone by applying an effective amount of plant extract, as described herein. The plant extract can be incorporated as a solid or an aqueous solution or syrup at various stages during the manufacture of food products, ingredients or other products.

As is evident from Example 2 and FIGS. 2 and 3 hereof, the stabilizing effect of the plant extract occurs across a wide range of extract concentrations and can be extrapolated to very low concentrations, e.g., less than 0.0025% by volume (see Table 1 and FIG. 3). As will be understood by those of skill in this art, the concentration of stabilizing agent required to stabilize a citrus-flavored composition, in accordance with the method of the invention, will generally depend upon a combination of factors. Such factors include, for example, the concentration and stability of the citrus-flavor ingredient, the storage temperature, the pH of the citrus composition, the composition and permeability of the packaging material, and the potency of the stabilizing agent. In general, the storage-stable citrus-flavored composition of the invention preferably contains between about 0.0001 percent (1 part per million, ppm) and about 0.5 percent (5000 ppm) plant extract (e.g., StabilEnhance® WSRE) or the equivalent, wherein the percentages are on a volume/volume basis. More preferably, the storage-stable citrus-flavored composition contains between about 0.001 percent (10 ppm) and about 0.05 percent (500 ppm) plant extract and, most preferably, between about 0.0025 percent (25 ppm) and about 0.02 percent (200 ppm) plant extract.

The present invention will become more clear from consideration of the following examples which are set forth to further illustrate the principles of the invention and are not intended, in any way, to be limiting thereof.

EXAMPLE 1

Preparation of water-soluble plant extract

Whole, dried rosemary leaves (10.0 g) were weighed into a 0.5 L container and 0.25 L of de-ionized water was added. The container was sealed and placed in an oven set at 90° C. for eight hours. After cooling to room temperature, the broth containing the desirable water-soluble compounds was filtered by suction through a glass-fiber filter. This produced 240 mL of an essentially clear, dark brown extract (pH 5.0). The brown extract was analyzed by standard high pressure liquid chromatography (HPLC) techniques, and found to contain 0.46 mg/mL rosmarinic acid (100 mg total; 90% recovery from the starting biomass). The crude extract was then acidified to a pH of 2.0 using sulfuric acid, which produced a fine, light-brown solid precipitate. The precipitate was not (but may be) removed prior to the next step. After cooling to room temperature, the cooled, acidified extract was loaded onto a 1 cm ×4 cm column packed with XAD-16 solid-phase absorbent at a flow rate of 2 mL/min. The desirable components of the plant material were retained on the column while many of the undesirable components passed through. After the entire volume of acidified extract was loaded, the column was washed with about 25 mL of a mildly acidic aqueous solution (1:1000 sulfuric acid in water), then air dried. The desired compounds were then eluted using 50 mL of 95% ethanol in water. The ethanol eluant contained essentially 100% of the rosmarinic acid that was applied to the column. The ethanol was removed under reduced pressure, yielding approximately 2 mL of a viscous, dark brown liquid containing approximately 15% ethanol, 410 g/L solids, and 57 g/L rosmarinic acid.

EXAMPLE 2

Stabilization of citrus-flavored compositions using water-soluble plant extracts Eight liters of a citrus-flavored composition (referred to herein as "citrus beverage base") was prepared as follows: 160 g/L high fructose corn syrup (HiSweet 55™ obtained from ADM Corp., Decatur, Ill.), 1.5 g/L citric acid, 0.17 g/L sodium citrate, and 0.5 g/L sodium benzoate were combined with water to a final volume of 8 liters. The pH was adjusted to 2.8 using citric acid. Citral (Aldrich Chemical, Milwaukee, Wis.) was added to a concentration of 8 ppm (64 μL). Samples of a citrus-flavored composition were prepared by adding 475 mL of citrus beverage base to five polyethylene bottles.

A water-soluble plant extract was prepared as described in Example 1. Plant extract was added to each of the five samples, prepared as described above, at the following concentrations:

TABLE 1

| Sample # | Final Concentration of Plant Extract | Volume of Plant Extract |
| --- | --- | --- |
| 1 | 0.02% (200 ppm) | 95 μL |
| 2 | 0.005% (50 ppm) | 25 μL |
| 3 | 0.0025% (25 ppm) | 12.5 μL |
| 4 (control) | 0% (0 ppm) | 0.0 μL |
| 5 | 0.01% (100 ppm) | 48 μL |

The samples were sealed and placed in a 40° C. oven to accelerate degradation. Samples were analyzed at various time points by HPLC to determine the concentrations of citral (both isomers, neral and geranial) and citral degradation products, namely p-cymen-8-ol, p-methylacetophenone, p-α-dimethylstyrene, p-cresol, and p-cymene.

Both isomers of citral degraded at the same rate in each of the samples, including the control. Citral was virtually depleted from each sample within 14 days. None of the samples (including control) contained measurable amounts of p-α-dimethylstyrene, p-cymene or p-cresol. As shown in FIG. 2, the concentration of p-cymen-8-ol increased in all samples (including control) over time, with the degree of increase being dependent upon the concentration of plant extract in the test sample. As shown in FIG. 3, the concentration of p-methylacetophenone was less in samples containing plant extract as compared to the control. The stabilizing effect of a plant extract on citrus-flavored compositions is particularly significant when viewed in terms of the taste thresholds for p-cymen-8-ol and p-methylacetophenone, as indicated by the broken lines in FIGS. 2 and 3, respectively. As will be understood by those of skill in this art, because of its high taste threshold and relatively insipid flavor, p-cymen-8-ol does not contribute significantly to the off-flavor of aged citrus-flavored compositions.

The description and examples set forth herein are intended to illustrate representative embodiments of the invention. The claims, which follow, are not intended to be limited to the specific disclosed embodiments. The invention is susceptible to modifications, variations and changes including, without limitation, those known to one of ordinary skill in the art without departing from the proper scope or fair meaning of the following claims.

We claim:

1. A method for preparing a storage-stable, citrus-flavored composition, said method comprising:

(a) providing a citrus-flavored composition comprising citral or a citral-derivative as a flavoring agent; and (b) adding a stabilizing agent comprising a water-soluble plant extract comprising a caffeic acid derivative to the citrus-flavored composition from step (a) to obtain a storage-stable, citrus-flavored composition comprising a water-soluble plant extract as the stabilizing agent.

2. The method according to claim 1, wherein said plant extract comprises rosmarinic acid.

3. A method according to claim 1, wherein said plant extract is derived from a plant of the Labiatae family.

4. A method according to claim 1, wherein said plant extract is an extract of rosemary.

5. (A method according to claim 1, wherein said plant extract is added to said citrus-flavored composition at a concentration of between about 1 ppm and about 5000 ppm.

6. A method according to claim 1, wherein said plant extract is added to said citrus-flavored at a concentration of between about 10 ppm and about 500 ppm.

7. A method according to claim 1, wherein said plant extract is added to said citrus-flavored composition at a concentration of between about 25 ppm and about 200 ppm.

8. A method for improving the stability of a citrus-flavored composition comprising citral or a citral derivative as a flavoring agent, said method comprising applying an effective amount of a stabilizing agent comprising a plant extract comprising a caffeic acid derivative.

9. A method according to claim 8, wherein said plant extract comprises rosmarinic acid.

10. A method according to claim 8, wherein said plant extract is derived from a plant in the Labiatae family.

11. A method according to claim 8, wherein said plant extract is an extract of rosemary.

12. A method according to claim 8, wherein said effective amount of said plant extract is between about 1 ppm and about 5000 ppm.

13. A method according to claim 8, wherein said effective amount of said plant extract is between about 10 ppm and about 500 ppm.

14. A method according to claim 8, wherein said effective amount of said plant extract is between about 25 ppm and about 200 ppm.

* * * * *